United States Patent
Soret et al.

(10) Patent No.: US 9,883,417 B2
(45) Date of Patent: Jan. 30, 2018

(54) LOAD INFORMATION EXCHANGE FOR INTERFERENCE COORDINATION

(71) Applicant: Nokia Solutions and Networks Oy, Espoo (FI)

(72) Inventors: Beatriz Soret, Aalborg (DK); Klaus Ingemann Pedersen, Aalborg (DK); Hua Wang, Aalborg (DK); Sonia Barcos, Granada (ES); Guillermo Pocovi, Aalborg East (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/300,552

(22) PCT Filed: Apr. 3, 2014

(86) PCT No.: PCT/EP2014/056719
§ 371 (c)(1),
(2) Date: Sep. 29, 2016

(87) PCT Pub. No.: WO2015/149858
PCT Pub. Date: Oct. 8, 2015

(65) Prior Publication Data
US 2017/0118668 A1    Apr. 27, 2017

(51) Int. Cl.
*H04W 24/00* (2009.01)
*H04W 24/10* (2009.01)
(Continued)

(52) U.S. Cl.
CPC .......... *H04W 24/10* (2013.01); *H04L 5/0032* (2013.01); *H04W 72/0486* (2013.01); *H04W 72/082* (2013.01)

(58) Field of Classification Search
CPC ............................. H04L 47/125; H04W 52/244
(Continued)

(56) References Cited

U.S. PATENT DOCUMENTS

| | | | |
|---|---|---|---|
| 2010/0087221 A1* | 4/2010 | Srinivasan | H04W 16/08 455/522 |
| 2013/0303153 A1 | 11/2013 | Bontu et al. | 455/423 |
| 2014/0106769 A1* | 4/2014 | Bai | H04W 52/244 455/452.1 |

FOREIGN PATENT DOCUMENTS

| | | |
|---|---|---|
| EP | 2 533 595 A1 | 12/2012 |
| EP | 2 680 647 A2 | 1/2014 |

OTHER PUBLICATIONS

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Paragraphs 20.2.2.6 and K.1.2", 3GPP TS 36.300 V10.2.0, Dec. 2010, 5 pgs.

(Continued)

*Primary Examiner* — Kiet Doan
(74) *Attorney, Agent, or Firm* — Harrington & Smith

(57) ABSTRACT

This document discloses a solution of interference coordination in wireless communication systems where a base station may request a specified load report from another base station. A first base station may store load information of terminal devices associated with the identifier of strongest interference source for each terminal device. The first base station may receive a load report request from a second base station. The first base station may respond to the second base station with a load report including load information of only terminal devices whose strongest interference source is the second base station. The second base station may receive the load report further and provide communication resources on the basis of the received load report.

14 Claims, 5 Drawing Sheets

(51) Int. Cl.
 *H04W 72/04* (2009.01)
 *H04W 72/08* (2009.01)
 *H04L 5/00* (2006.01)

(58) Field of Classification Search
 USPC .................. 455/452.1, 450, 526, 522, 277.1;
 370/241, 338, 329, 457, 280, 315;
 342/357.72, 357.48, 357.47
 See application file for complete search history.

(56) References Cited

OTHER PUBLICATIONS

"3$^{rd}$ Generation Partnership Project; Technical Specification Group Radio Access Network; Evolved Universal Terrestrial Radio Access Network (E-UTRAN); X2 application protocol (X2AP) (Release 12), Paragraphs 8.3.6; 8.3.7; 9.1.2.11-9.1.2.14; 9.2.37; 9.2.44; 9.2.45; and 9.2.58", 3GPP TS 36.423 V12.0.0, Dec. 2013, 13 pgs.
Soret, Beatriz, et al., "Fast Muting Adaptation for LTE-A HetNets with Remote Radio Heads", © 2013 IEEE, 6 pgs.

\* cited by examiner

LOAD INFORMATION EXCHANGE FOR INTERFERENCE COORDINATION

FIELD

The invention relates generally to wireless communication systems, and more particularly, to interference coordination in heterogeneous networks.

BACKGROUND

Wireless networks are widely configured to provide various communication services such as voice, video, packet data, messaging, broadcast, and the like. These networks may be comprised of many different types of cells, such as macro cells and small cells. For example, small cells may be used to enhance network capability areas were network requires more resources. For example, densely populated areas may need more network capability to serve all terminal devices in the area. However, macro cells may cause interference for users which are served by small cells. Interference causes the network to lose capacity.

BRIEF DESCRIPTION

The invention is defined by the independent claims.

According to an aspect, there is provided an apparatus comprising means for carrying out all the steps of the method according to any one of the appended claims.

According to an aspect, there is provided a computer program product embodied on a distribution medium readable by a computer and comprising program instructions which, when loaded into an apparatus, execute the method according to any one of the appended claims.

Embodiments of the invention are defined in the dependent claims.

BRIEF DESCRIPTION OF THE DRAWINGS

In the following the invention will be described in greater detail by means of preferred embodiments with reference to the attached drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system.

Figure 1:
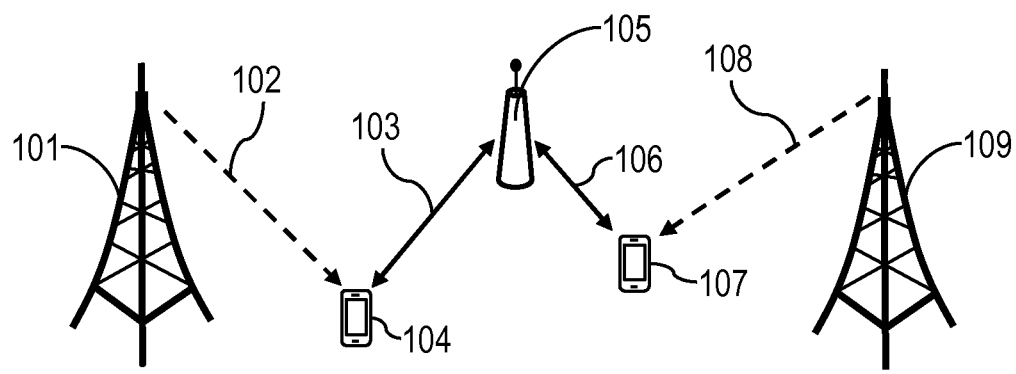
FIG. 1 illustrates scenario with different macro base stations causing interference to terminal devices serving cell provided by a small base station.

A general wireless communication system scenario to which embodiments of the invention may be applied is illustrated in FIG. 1. FIG. 1 illustrates a wireless communication system comprised of a small base station 105, a plurality of macro base stations 101, 109 which are located at least partially inside a small cell provided by the base station 105 and a plurality of terminal devices 104, 107. Terminal devices 104, 107 may be connected to the small base station 105 via wireless signals 103, 106. Terminal devices 104, 107 may be under interference signals 102, 108 which are caused by the transmitting macro base station 101, 109. For the terminal device 104 the strongest interference signal 102 may be caused by the macro base station 101. For the terminal device 107 the strongest interference signal 108 may be caused by the macro base station 109. The terminal devices 104, 107 may be served by the same small base station 105 but may perceive different macro base stations 101, 109 as their strongest interference source.

The term "base station" may be node B (NB) as in the LTE, evolved node B (eNB) as in the LTE-A, a radio network controller (RNC) as in the UMTS, a base station controller (BSC) as in the GSM/GERAN, or any other apparatus capable of controlling radio communication and managing radio resources within a cell.

The cellular network may be a heterogeneous network comprising at least one macro cell provided by a macro base station and at least one small cell smaller than the macro cell provided by a small base station, and wherein the small cell provided by the small base station is smaller than the macro cell. The cellular network may be, for example, a long term evolution (LTE) or LTE-advanced (LTE-A) network. Small base station may provide a small cell which can, for example, be a micro, a pico or a femto cell. These small cells may be used to increase network capacity in areas where there might be a lot of terminal devices to be served. In these areas, other base stations may cause interference to terminal devices which may, for example, be served by small base stations. The load information exchange may be transmitted over an X2 interface or a similar interface used for communication between base stations. Instead of the broadcast message, a unicast or a multicast message may be employed to transfer the corresponding information.

Macro base stations may be configured to reduce the interference to the small cells by sending almost blank subframes (ABS) with a configured muting pattern which may be periodically repeated. The periodic repetition may be, for example, 40 milliseconds in frequency domain division (FDD) LTE. ABSs may be configured to coordinate inter-cell interference in the time domain in enhanced inter-cell interference coordination (eICIC). ABSs may only contain some necessary signals with low power and may be used by the interfered cell to provide service for its subscribers who previously experienced strong interference from those base stations which are sending the ABSs. The decision of the muting pattern may be to a large extent based on load information reported by the small base station(s). It may conventionally be assumed that for all of the terminal devices served by the small base station, the strongest interference source is the macro base station requesting a load report from the small base station. However, this may not always be the case. By assuming that for all of the terminal devices served by the small base station, the strongest interference source is the macro base station requesting the load report, the muting pattern may cause the macro base stations to unnecessarily lose capacity.

Figure 2:
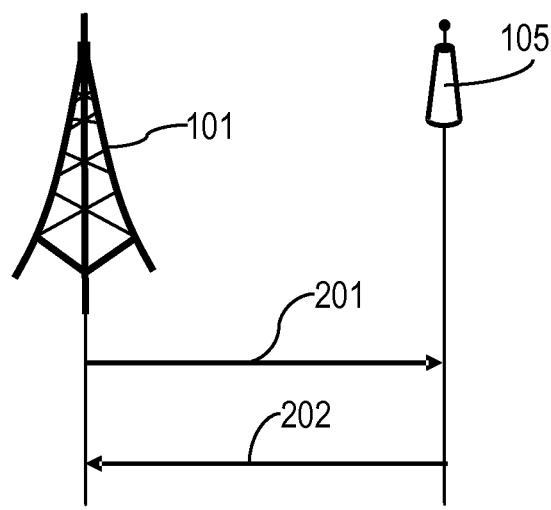
FIG. 2 illustrates load information exchange between a macro base station and a small base station according to an embodiment of the invention.

A method of interference coordination in a cellular network is proposed in FIG. 2. FIG. 2 illustrates load information exchange between a macro base station and a small base station according to an embodiment of the invention. The small base station 105 may store an identifier of strongest interference source for each terminal device comprised in the small cell (i.e. served by the small base station 105) and load information of said terminal devices. Strongest interference source for a terminal device in a cellular network may be a base station which causes strongest interference signal to the said terminal device. Strongest interference signal to the said terminal device may be the strongest signal of signals sent by all of the base stations which neighbor the small base station 105 serving said terminal device. Strongest interference source may be, for example, a downlink signal sent by the macro base station 101 to a terminal device locating relatively far from the sending macro cell, which may result in a use of a high transmission power by the macro base station 101. The macro base station 101 may send a load report request 201 to the small base station 105. The small base station may receive the load report request 201 from the macro base station 101. The small base station 105 may respond to the load report request 201 with a load report 202 comprising load of information of only terminal devices whose strongest interference source may be the macro base station 101. The macro base station 101 may receive, from the small base station 105, the load report 202 comprising load information of only terminal devices whose strongest interference source may be the macro base station 101. The macro base station 101 may provide communication resources on the basis of the received load report 202. The load report request 201 may be performed as a basic function of the macro base station 101 to enable information exchange about load levels in the small cell provided by the small base station 105 and about available capacity. Terminal device may report, to the small base station 105, identity and/or interference signal strength of the base stations which may cause interference to the said terminal device. The small base station 105 may further store the strongest interference source's identity associated with the said terminal device.

Figure 3:
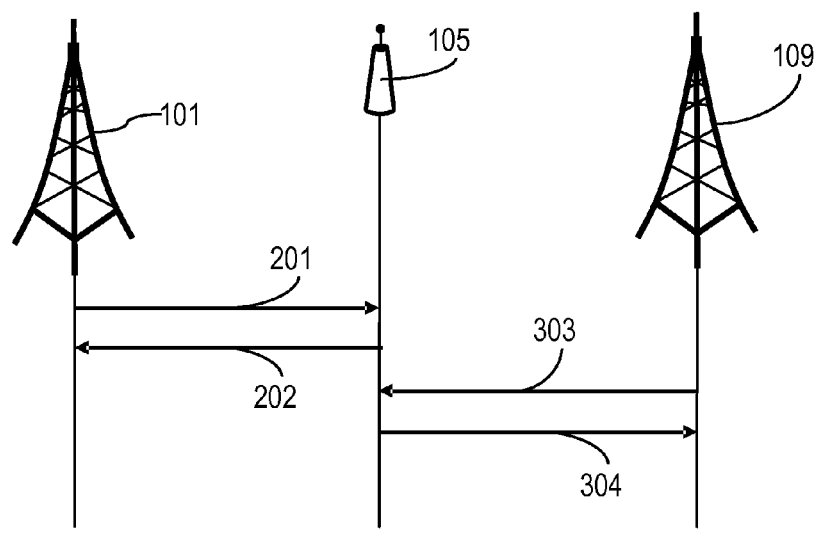
FIG. 3 illustrates load information exchange between two macro base stations and a small base station according to an embodiment of the invention.

Let us now describe the process of FIG. 2 in the multi-macro base station situation with reference to FIG. 3. FIG. 3 illustrates load information exchange between two macro base stations and the small base station according to an embodiment of the invention. In reality, the number of base stations in each system may be higher but similar approach may be applied to the other base stations in a straightforward manner. Referring to FIG. 3, the macro base station 109 may send a load report request 303 to the small base station 105. The small base station 105 may receive the load report request 303 from the macro base station 109. The small base station 105 may respond to the load report request 303 with a load report 304 comprising load of information of only terminal devices whose strongest interference source may be the macro base station 109. The macro base station 109 may receive, from the small base station 105, the load report 304 comprising load information of only terminal devices whose strongest interference source may be the macro base station 109. The macro base station 109 may provide communication resources on the basis of the received load report 304. Providing communication resources may comprise, for example, increasing or decreasing the amount of sent ABSs in the macro base station 101, 109.

Figure 4:
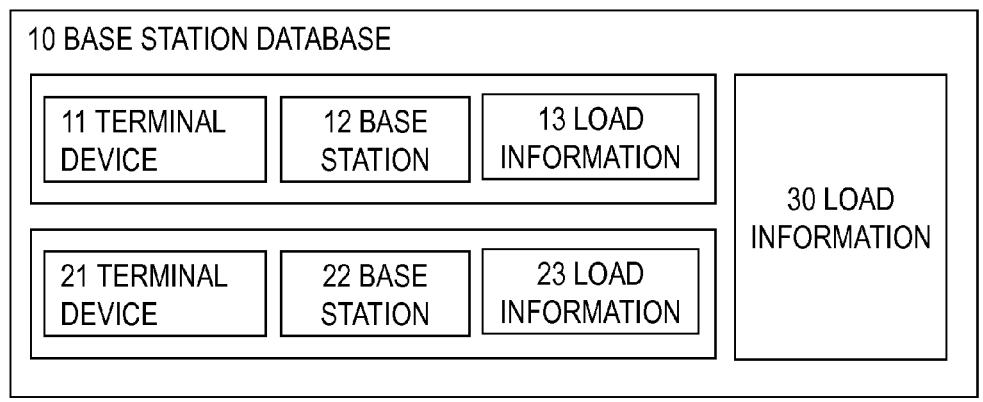
FIG. 4 illustrates a database for storing the identifier of the strongest interference source and load information in the base station according to an embodiment of the invention.

FIG. 4 illustrates a database for storing the identifier of the strongest interference source and load information in the base station. Referring to FIG. 4, a reference to terminal device 11, which may be served by the storing base station, may be stored with reference to the base station 12 which may be the strongest interference source for the terminal device 11. Additionally, terminal device 11-specific load information 13 may be stored in the base station database 10. Base station database 10 may comprise information of all of the terminal devices it is serving or only some of the terminal devices. Base station database 10 may in this manner store reference to terminal device 21 for which base station 22 may be defined as the strongest interference source and also terminal device 21-specific load information 23. Load information 30 may comprise some or all of the terminal device-specific load information stored in a separate space in the base station database 10. It may be also possible that terminal device specific load information 13, 23 may not be stored at all, but load information 30 may be and vice versa.

Figure 5:
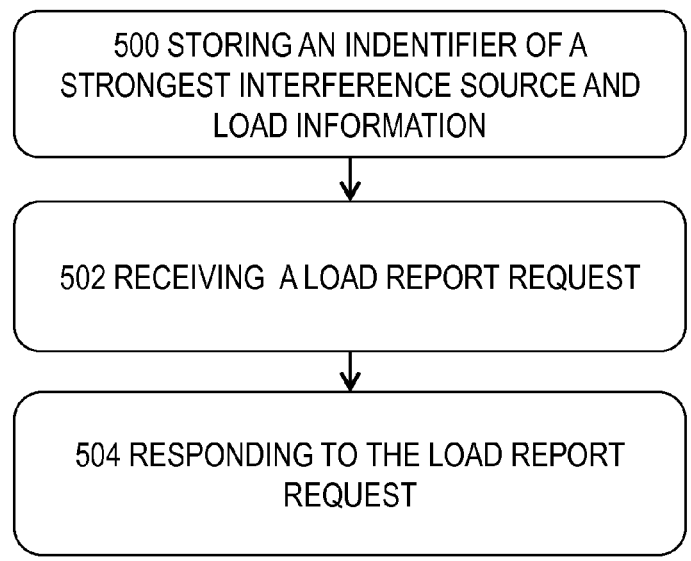
FIG. 5 illustrates a flow diagram of storing strongest interference source and load information of terminal devices and responding to a load report request according to an embodiment of the invention.

FIG. 5 illustrates a flow diagram of storing strongest interference source and load information of terminal devices and responding to a load report request according to an embodiment of the invention. Referring to FIG. 5, in step 500, load information for each terminal device may be stored in a first base station. In addition, an identifier of the strongest interference source may be stored in the first base station for each terminal device. Strongest interference source may be another base station which causes interference to terminal devices. In step 502, the first base station may receive a load report request. The load report request may comprise only information of the requesting base station or it may further comprise a flag which indicates which load information should be comprised in a load report. In step 504, the first base station may respond to the load report request with the said load report.

Figure 6:
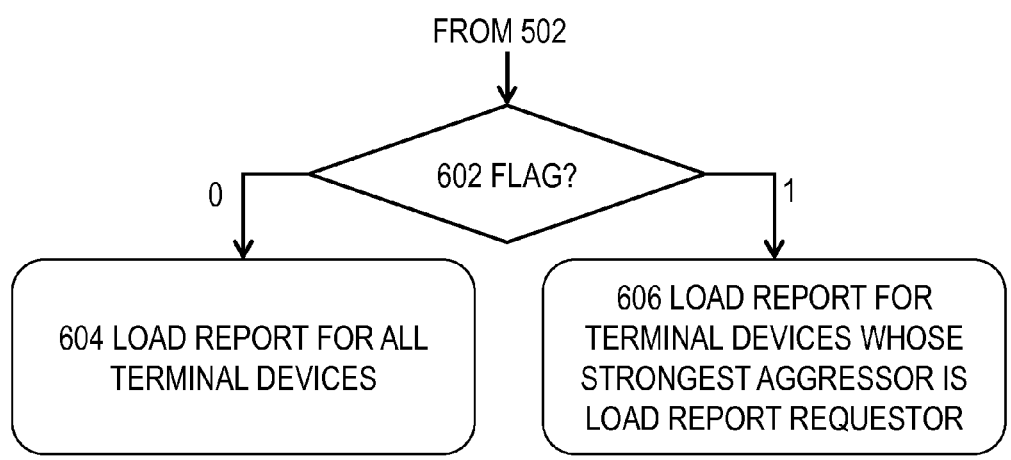
FIG. 6 illustrates a flow diagram of determining the type of load report response according to an embodiment of the invention.

FIG. 6 illustrates a flow diagram of determining the type of load report response according to an embodiment of the invention where load report request contains a flag. Referring to FIG. 6, load report request may have been received as described in step 502. In block 602, which may follow step 502, the value of the load report requests flag may be determined. If value equals 0 the base station receiving the load report request may comprise to a load report all of the terminal devices served by the base station, as described in block 604, which may be sent back to load report requesting base station. If value equals 1 the base station receiving the load report request may comprise to a load report only terminal devices served by the base station, as described in block 606, whose strongest interference source may be the load report requesting base station. The mapping between the value of the flag and the type of load report may be implementation specific. The base station receiving the load report request may have a method of associating requesting base station's identifier with the strongest aggressors of terminal devices stored in the base station database.

Figure 7:
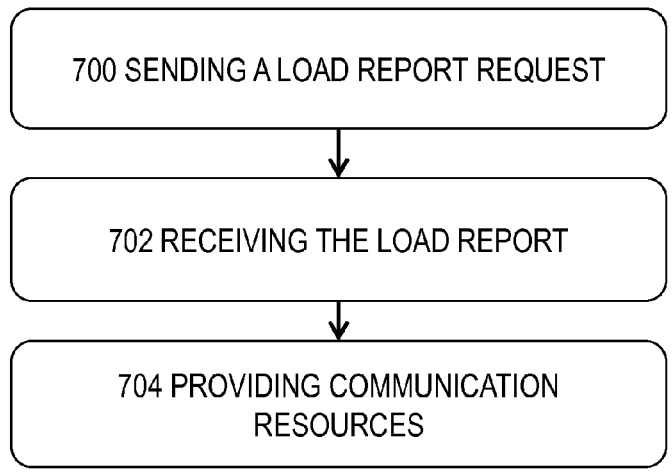
FIG. 7 illustrates a flow diagram of load report requesting, receiving and utilization according to an embodiment of the invention.

FIG. 7 illustrates a flow diagram of load report requesting, receiving and utilization according to an embodiment of the invention. Referring to FIG. 7, in step 700, a second base station may send the load report request to another base station. In step 702, the second base station may receive a load report, which may comprise load information of terminal devices, served by the base station to which the load report request may have been sent, according to the load report request. In step 704, the load report may be utilized to provide communication resources to the terminal devices, served by the base station to which the load report request may have been sent.

In another embodiment of the invention, the load report 304 may comprise load information of all of the terminal devices comprised in the small cell provided by the small base station 105. Additionally, the macro base station 109 may receive from the small base station 105 the load report 304 comprising load information of all of the terminal devices comprised in the small cell provided by the small base station 105.

The load report requests 201, 303 may further comprise a flag indicating should the load reports 202, 304 comprise only load information of terminal devices comprised in the cell, provided by the small base station 105, whose strongest interference source may be the base station requesting the load report 202, 304 or load information of all of the terminal devices comprised in the first cell, provided by the small base station 105. The said flag indicator may, for example, be a one-bit indicator. The said flag indicator may further be defined, for example, as "OnlyVictimUsers". If the flags value equals 0, it may mean that the load report has to include all terminal devices in the cell provided by a small base station 105, and if the value equals 1, it may mean that the load report has to include uniquely users for which the requesting base station 101, 109 is the strongest interference source, for example.

Figure 8:
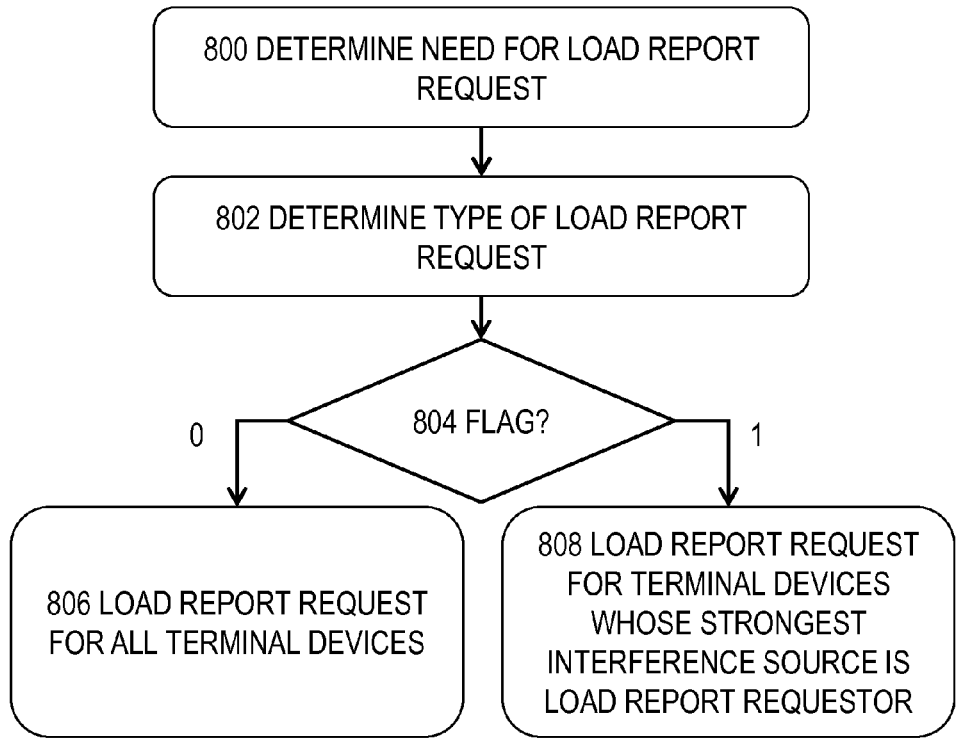
FIG. 8 illustrates a flow diagram determining the type of load report request according to an embodiment of the invention.

FIG. 8 illustrates a flow diagram determining the type of load report request according to an embodiment of the invention where load report request contains a flag. Referring to FIG. 8, in block 800, a need for load report request may be determined. After the need for load report request may have been determined, in block 802 the type of load report request may be determined. In block 804, the flags value may be set to 0 or 1 depending on the determination of load report request in block 802. In block 806, if the flags value equals 0, the flag comprised in the load report request may indicate that the load report may need to comprise load information of all of the terminal devices served by the base station to which the load report request may be sent. In block 808, if the flags value equals 1, the flag comprised in the load report request may indicate that the load report may need to comprise load information of only terminal devices, served by the base station to which the load report request may have been sent, whose strongest interference source may be the base station requesting the load report.

The small cell, provided by the small base station 105, may further be located at least partially or completely inside a cell provided by the macro base station 101 or the macro base station 109.

In an embodiment the first base station may be the small base station and a second base station or a third base station may be the macro base station.

In an embodiment the first base station may provide a first cell, the second base station may provide a second cell and/or the third base station may provide a third cell.

In an embodiment the first cell may be smaller or larger than the second cell and/or the third cell.

In an embodiment the first cell may be the same size as the second cell and/or the third cell.

In an embodiment the first cell is at least partially located inside a cell provided by the second base station or the third base station.

In an embodiment the first cell is completely located inside a cell provided by the second base station or the third base station.

In an embodiment the cellular network is a heterogeneous network comprising at least one macro cell and one cell smaller than the macro cell, and wherein the first cell provided by the first base station is smaller than the macro cell.

The load information comprised in the load report 202, 304 may comprise the number of terminal devices, required resources to accommodate the terminal devices, physical resource block (PRB) utilization and the usage of ABS resources by the small base station, for example. For example, in LTE networks specific number of subcarriers may be allocated for a predetermined amount of time. These subcarriers allocations for a period of time may be referred as PRBs. The load information may further comprise resource status with the information of PRB utilization, wherein said PRB utilization of the small base station may comprise all of the terminal devices comprised in the small cell provided by the small base station, or only terminal devices comprised in the said small cell whose strongest interference source may be the base station requesting the load report. The load information may further comprise information of available capacity of the small base station, wherein information of available capacity may comprise all the terminal devices served by the small cell provided by the small base station, or only terminal devices comprised in the said small cell whose strongest interference source may be the base station requesting the load report. The load information may further comprise ABS status with percentage of used ABS resources by the small base station, wherein ABS status may comprise all the terminal devices served by the small cell provided by the small base station, or only terminal devices comprised in the said small cell whose strongest interference source may be the base station requesting the load report.

In an embodiment the load information comprising said information of PRB utilization of all of the terminal devices comprised in the small cell provided by the small base station and/or said information of available capacity of all of the terminal devices comprised in the small cell provided by the small base station, may be used for load balancing between base stations.

In an embodiment the load information containing said ABS status with percentage of used ABS resources may be used to increase or decrease the amount of sent ABSs by the base station requesting the load report, wherein said ABS status may comprise all the terminal devices served by the small cell provided by the small base station, or only terminal devices comprised in the said small cell whose strongest interference source may be the base station requesting the load report.

In another embodiment of the invention, the small base station 105 may store an identifier of strongest interference source and load information for terminal devices which are selected according to a predetermined configuration.

Figure 9:
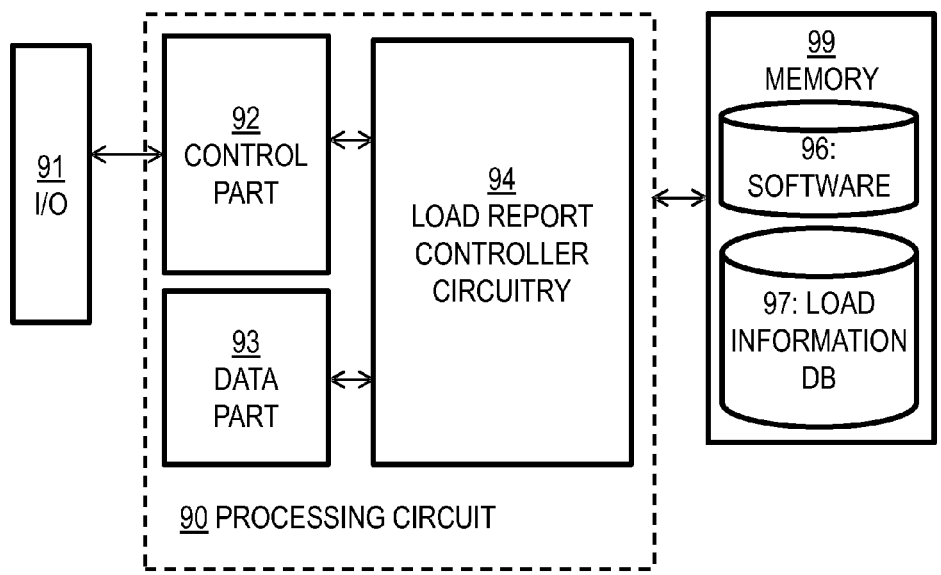
FIGS. 9 and 10 illustrate apparatuses according to some embodiments.

FIG. 9 illustrates an embodiment of an apparatus comprising means for carrying out the above mentioned functionalities of the small base station. The small base station may comply with specifications of $3^{rd}$ generation partnership project (3GPP) network and/or another wireless network. The small cell base station may be a micro base station, a pico base station or a home eNB, for example. In an embodiment, the apparatus carrying out the above-described functionalities of the small base station is comprised in the small base station, e.g. the apparatus may comprise a circuitry, e.g. a chip, a processor, a micro controller, or a combination of such circuitries in the small base station.

Referring to FIG. 9, the apparatus may comprise a processing circuit 90 configured to control load information in the small base station. The processing circuit 90 may configure the storing of load information, the receiving of a load report request and responding to the load report request with a load report in the apparatus, as described above. The processing circuit 90 may comprise a control part 92 handling load information with respect to storing, request reception and load report response. The control part 92 may also determine and store strongest interference source for each terminal device served by the small base station. The processing circuit 90 may further comprise a data part 93 that handles transmission and reception of load information related data when the base station is associated to one or more network device.

The processing circuit 90 may further comprise a load report controller circuitry 94 configured to carry out at least some of the above-described embodiments. The load report controller circuitry 94 may thus determine what information may be comprised in the load report depending on the type of load report request. For example, if the load report request may contain a flag, the load report controller circuitry 94 may determine which kind of load report may be comprised in the load report response as illustrated in FIG. 6.

The circuitries 92 to 94 of the processing circuit 90 may be carried out by the one or more physical circuitries or processors. In practice, the different circuitries may be realized by different computer program modules. Depending on the specifications and the design of the apparatus, the apparatus may comprise some of the circuitries 92 to 94 or all of them.

The apparatus may further comprise the memory 99 that stores computer programs (software) 96 configuring the apparatus to perform the above-described functionalities of the small base station. The memory 99 may also store communication parameters and other information needed for load information exchange, e.g. addresses and other parameters assigned to the base station with respect to different associations. The apparatus may store load information and strongest aggressor information to load information database 97. The load information database 97 may comprise a base station database 10 as illustrated in FIG. 3.

The apparatus may further comprise radio interface components 91 providing the apparatus with radio communication capabilities within one or more wireless networks. The radio interface components 91 may comprise standard well-known components such as an amplifier, filter, frequency-converter, (de)modulator, and encoder/decoder circuitries and one or more antennas. The apparatus may further comprise a user interface enabling interaction with the user of the small base station. The user interface may comprise a display, a keypad or a keyboard, a loudspeaker, etc.

In an embodiment, the apparatus carrying out the embodiments of the invention in the small base station comprises at least one processor and at least one memory including a computer program code, wherein the at least one memory and the computer program code are configured, with the at least one processor, to cause the apparatus to carry out the functionalities of the small base station according to any one of the embodiments of FIGS. 2 to 8. Accordingly, the at least one processor, the memory, and the computer program code form processing means for carrying out embodiments of the present invention in the base station.

Figure 10:
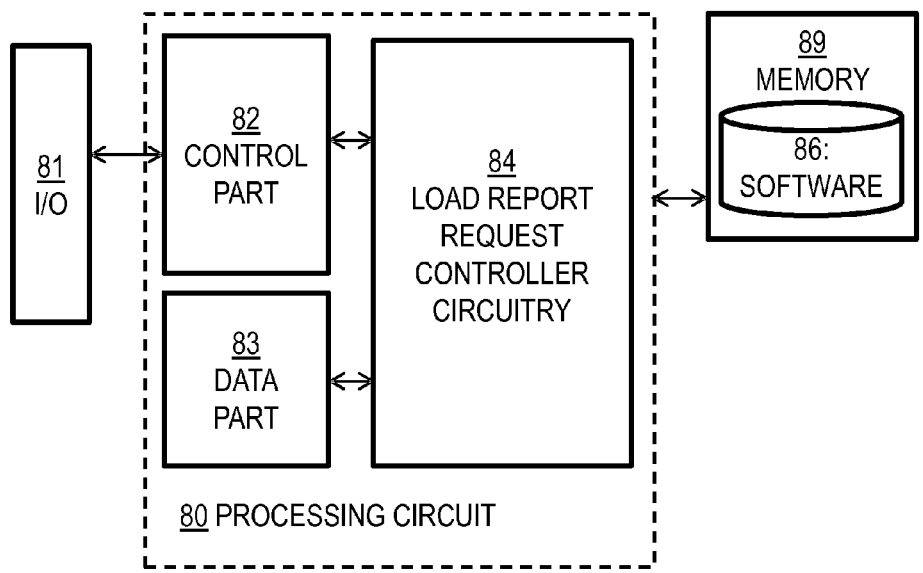

FIG. 10 illustrates an embodiment of an apparatus comprising means for carrying out the above mentioned functionalities of the macro base station. The macro base station may comply with specifications of $3^{rd}$ generation partnership project (3GPP) network and/or another wireless network. In an embodiment, the apparatus carrying out the above-described functionalities of the macro base station is comprised in the macro base station, e.g. the apparatus may comprise a circuitry, e.g. a chip, a processor, a micro controller, or a combination of such circuitries in the macro base station.

Referring to FIG. 10, the apparatus may comprise a processing circuit 80 configured to control load information exchange in the macro base station. The processing circuit 80 may configure the sending of a load report request, receiving the load report and providing communication resources, as described above. The processing circuit 80 may comprise a control part 82 handling sending load report request, receiving load report and providing communication resources. The processing circuit 80 may further comprise a data part 83 that handles transmission and reception of load information related data when the base station is associated to one or more network device.

The processing circuit 80 may further comprise a load report request controller circuitry 84 configured to carry out at least some of the above-described embodiments. The load report request controller circuitry 84 may thus determine the need for load report requesting and what information may be comprised in the load report depending on the type of load report request. For example, load report request may comprise a flag indicating which kind of load report is requested.

The circuitries 82 to 84 of the processing circuit 80 may be carried out by the one or more physical circuitries or processors. In practice, the different circuitries may be realized by different computer program modules. Depending on the specifications and the design of the apparatus, the apparatus may comprise some of the circuitries 82 to 84 or all of them.

The apparatus may further comprise the memory 89 that stores computer programs (software) 86 configuring the apparatus to perform the above-described functionalities of the macro base station. The memory 89 may also store communication parameters and other information needed for load information exchange, e.g. addresses and other parameters assigned to the base station with respect to different associations.

The apparatus may further comprise radio interface components 81 providing the apparatus with radio communication capabilities within one or more wireless networks. The radio interface components 81 may comprise standard well-known components such as an amplifier, filter, frequency-converter, (de)modulator, and encoder/decoder circuitries and one or more antennas. The apparatus may further comprise a user interface enabling interaction with the user of the macro base station. The user interface may comprise a display, a keypad or a keyboard, a loudspeaker, etc.

In an embodiment, the apparatus carrying out the embodiments of the invention in the macro base station comprises at least one processor and at least one memory including a computer program code, wherein the at least one memory and the computer program code are configured, with the at least one processor, to cause the apparatus to carry out the functionalities of the macro base station according to any one of the embodiments of FIGS. 2 to 8. Accordingly, the at least one processor, the memory, and the computer program code form processing means for carrying out embodiments of the present invention in the base station.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

The processes or methods described in FIGS. 2 to 8 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless communication systems defined above but also to other suitable wireless communication systems. The protocols used, the specifications of systems, their network elements and terminal devices, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   storing an identifier of a strongest interference source for each terminal device included in a first cell provided by a first base station and load information of each terminal device;
   receiving a load report request from a second base station; and
   responding to the load report request with a load report including load information of each terminal device having the second base station as the strongest interference source,
   wherein the method is a method for interference coordination in a cellular network performed by the first base station,
   wherein said load report request includes a flag indicating that the load report includes one of:
      load information of each terminal device included in the first cell having the base station requesting the load report as the strongest interference source; and
      load information of each terminal device included in the first cell, and
   wherein the flag is a one-bit indicator.

2. The method of claim 1, further comprising:
   receiving a second load report request from one of the second base station and a third base station; and
   responding to the second load report request with a load report including load information of each terminal device included in the first cell.

3. The method of claim 1, wherein said load information comprises resource status with the information of physical resource block (PRB) utilization of the first base station, and wherein said PRB utilization takes into account one of: each terminal device included in the first cell; and each terminal device included in the first cell having the base station requesting the load report as the strongest interference source.

4. The method of claim 1, wherein said load information comprises information of available capacity of the first base station, and wherein said available capacity takes into account one of: each terminal device included in the first cell; and each terminal device included in the first cell having the base station requesting the load report as the strongest interference source.

5. The method of claim 1, wherein said load information comprises an almost blank subframe (ABS) status of the first base station, and wherein said ABS status takes into account one of: each terminal device included in the first cell; and each terminal device included in the first cell having the base station requesting the load report as the strongest interference source.

6. A method comprising:
sending a load report request to a first base station;
receiving, from the first base station, a load report including load information of each terminal device having a second base station as a strongest interference source, said second base station providing a second cell; and
providing communication resources to each terminal device having said second base station as a strongest interference source on the basis of the received load report,
wherein the method is a method for interference coordination in a cellular network performed by the second base station,
wherein said load report request includes a flag indicating that the load report includes one of:
 load information of each terminal device included in the first cell having the base station requesting the load report as the strongest interference source; and
 load information of each terminal device included in the first cell, and
wherein the flag is a one-bit indicator.

7. The method of claim 6, further comprising:
sending a second load report request to the first base station;
receiving, from the first base station, a load report including load information of each terminal device included in a first cell, the first cell being provided by the first base station; and
providing communication resources to each terminal device included in the first cell on the basis of the received load report.

8. An apparatus comprising:
at least one processor; and
at least one memory including a computer program code, wherein the at least one memory and the computer program code are configured, with the at least one processor, to cause the apparatus to:
 store an identifier of a strongest interference source for each terminal device included in a first cell provided by a first base station and load information of each terminal device;
 receive a load report request from a second base station; and
 respond to the load report request with a load report including load information of each terminal device having the second base station as the strongest interference source,
wherein the apparatus is the first base station and is one for interference coordination in a cellular network,
wherein said load report request includes a flag indicating that the load report includes one of:
 load information of each terminal device included in the first cell having the base station requesting the load report as the strongest interference source; and
 load information of each terminal device included in the first cell, and
wherein the flag is a one-bit indicator.

9. The apparatus of claim 8, wherein the at least one memory and the computer program code are further configured, with the at least one processor, to cause the apparatus to:
 receive a second load report request from one of the second base station and a third base station; and
 respond to the second load report request with a load report including load information of each terminal device included in the first cell.

10. The apparatus of claim 8, wherein said load information comprises resource status with the information of PRB utilization of the first base station, and wherein said PRB utilization takes into account one of: each terminal device included in the first cell; and each terminal device included in the first cell having the base station requesting the load report as the strongest interference source.

11. The apparatus of claim 8, wherein said load information comprises information of available capacity of the first base station, and wherein said available capacity takes into account one of: each terminal device included in the first cell; and each terminal device included in the first cell having the base station requesting the load report as the strongest interference source.

12. The apparatus of claim 8, wherein said load information comprises ABS status of the first base station, and wherein said ABS status takes into account one of: each terminal device included in the first cell; and each terminal device included in the first cell the base station requesting the load report as the strongest interference source.

13. An apparatus comprising:
at least one processor; and
at least one memory including a computer program code, wherein the at least one memory and the computer program code are configured, with the at least one processor, to cause the apparatus to:
 send a load report request to a first base station;
 receive, from the first base station, a load report including load information of each terminal device having a second base station as a strongest interference source, said second base station providing a second cell; and
 provide communication resources to each terminal device having said second base station as a strongest interference source on the basis of the received load report,
wherein the apparatus is the second base station and is one for interference coordination in a cellular network,
wherein said load report request includes a flag indicating that the load report includes one of:
 load information of each terminal device included in the first cell having the base station requesting the load report as the strongest interference source; and
 load information of each terminal device included in the first cell, and
wherein the flag is a one-bit indicator.

14. The apparatus of claim 13, wherein the at least one memory and the computer program code are further configured, with the at least one processor, to cause the apparatus to:
 send a second load report request to the first base station;
 receive, from the first base station, a load report including load information of each terminal device included in a first cell, the first cell being provided by the first base station; and
 providing communication resources to each terminal device included in the first cell on the basis of the received load report.

* * * * *